(12) United States Patent
Chikamura et al.

(10) Patent No.: US 8,681,862 B2
(45) Date of Patent: Mar. 25, 2014

(54) MOVING PICTURE DECODING APPARATUS AND MOVING PICTURE DECODING METHOD

(75) Inventors: Keishi Chikamura, Osaka (JP); Takeshi Tanaka, Osaka (JP)

(73) Assignee: Panasonic Corporation, Osaka (JP)

( * ) Notice: Subject to any disclaimer, the term of this patent is extended or adjusted under 35 U.S.C. 154(b) by 854 days.

(21) Appl. No.: 12/517,108

(22) PCT Filed: May 14, 2008

(86) PCT No.: PCT/JP2008/001207
§ 371 (c)(1),
(2), (4) Date: Jun. 1, 2009

(87) PCT Pub. No.: WO2008/146455
PCT Pub. Date: Dec. 4, 2008

(65) Prior Publication Data
US 2010/0054332 A1    Mar. 4, 2010

(30) Foreign Application Priority Data

May 22, 2007 (JP) ................................. 2007-135137

(51) Int. Cl.
*H04N 7/12* (2006.01)
*H04N 11/02* (2006.01)
*H04N 11/04* (2006.01)
*H04B 1/66* (2006.01)
*H04N 7/26* (2006.01)

(52) U.S. Cl.
CPC ............................... *H04N 19/00515* (2013.01)
USPC .................................................. 375/240.12

(58) Field of Classification Search
None
See application file for complete search history.

(56) References Cited

U.S. PATENT DOCUMENTS

| 5,880,786 A | 3/1999 | Oku et al. |
| 5,909,224 A * | 6/1999 | Fung ............................. 345/531 |

(Continued)

FOREIGN PATENT DOCUMENTS

| JP | 8-18953 | 1/1996 |
| JP | 11-298903 | 10/1999 |
| JP | 2000-175201 | 6/2000 |
| JP | 2002-218474 | 8/2002 |
| JP | 2002-247583 | 8/2002 |
| JP | 2004-215049 | 7/2004 |

(Continued)

OTHER PUBLICATIONS

International Search Report issued Aug. 12, 2008 in the International (PCT) Application of which the present application is the U.S. National Stage.

(Continued)

*Primary Examiner* — Nhon Diep
(74) *Attorney, Agent, or Firm* — Wenderoth, Lind & Ponack, L.L.P.

(57) ABSTRACT

A moving picture decoding apparatus (10) that decodes moving picture data including a coded picture which has been coded according to a coding scheme of performing inter-frame prediction with reference to a maximum of n pictures, where n is an integer equal to or greater than 2, the moving picture decoding apparatus (10) comprising: an H.264 decoder (100) which decodes the coded picture included in the moving picture data using the inter-frame prediction; an external memory (107) which stores a decoded picture for external output thereof; an internal memory (106) which stores n decoded pictures which can be referred to for the inter-frame prediction; and a second transfer unit (102) which transfers the decoded picture from the external memory (107) to the internal memory (106) so that the n decoded pictures are stored in the internal memory (106) before decoding of one coded picture starts.

10 Claims, 11 Drawing Sheets

(56) References Cited

U.S. PATENT DOCUMENTS

| | | | |
|---|---|---|---|
| 6,240,210 B1 * | 5/2001 | Koyama | 382/233 |
| 6,275,532 B1 * | 8/2001 | Hibi et al. | 375/240.17 |
| 6,489,996 B1 * | 12/2002 | Matsumura et al. | 348/416.1 |
| 6,735,340 B1 * | 5/2004 | Ohno | 382/238 |
| 6,862,318 B2 | 3/2005 | Matsumura et al. | |
| 6,871,001 B1 * | 3/2005 | Okada | 386/343 |
| 7,916,792 B2 * | 3/2011 | Oh | 375/240.23 |
| 2002/0061184 A1 * | 5/2002 | Miyamoto | 386/68 |
| 2002/0114396 A1 | 8/2002 | Todoroki | |
| 2002/0136299 A1 | 9/2002 | Matsumura et al. | |
| 2005/0117643 A1 * | 6/2005 | Hatabu et al. | 375/240.12 |
| 2005/0232500 A1 * | 10/2005 | Boon et al. | 382/236 |
| 2005/0235335 A1 * | 10/2005 | Morita et al. | 725/133 |

FOREIGN PATENT DOCUMENTS

| | | |
|---|---|---|
| JP | 2006-115168 | 4/2006 |
| JP | 2006-166308 | 6/2006 |
| JP | 2006-287583 | 10/2006 |

OTHER PUBLICATIONS

ITU-T Recommendation H.262 "Information technology—Generic coding of moving pictures and associated audio information: Video", pp. 79-83 (Feb. 2000).

ITU-T Recommendation H.264 "Advanced video coding for generic audiovisual services", pp. 149-159; pp. 249-261 (Mar. 2005).

\* cited by examiner

Non-referenced pictures

MOVING PICTURE DECODING APPARATUS AND MOVING PICTURE DECODING METHOD

TECHNICAL FIELD

The present invention relates to a moving picture decoding apparatus and a moving picture decoding method for decoding coded pictures which have been coded according to a coding standard of performing inter-frame prediction.

BACKGROUND ART

Conventionally, a coding technique of Moving Picture Expert Group (MPEG) (see Non-Patent Reference 1) has been used for compress-coding (hereinafter simply referred to as "coding") moving picture data using inter-frame differences. Further, in recent years, H.264 that achieves higher compression (see Non-Patent Reference 2) has been adopted as a coding standard.

Inter-frame prediction, an elemental technique for coding and decoding moving picture data, requires a memory for storing decoded pictures because pixel values are predicted using information on the decoded pictures. The memory has conventionally been provided outside a system LSI that includes the decoding unit and so on, in view of a necessary storage capacity and a chip area (see Patent Reference 1).

Pictures stored in the external memory include a currently decoded picture, a picture which may be referred to by the currently decoded picture, and a picture outputted to a display unit.

Thus, it is necessary to perform processing such as sequentially reading decoded pictures from the external memory to the decoding unit for inter-frame prediction and so on, as well as writing a currently decoded picture to the external memory.

Particularly, the processing of sequentially reading decoded pictures for inter-frame prediction involves frequent data transfer and a large transfer volume. This has resulted in a problem of high cost because the access bandwidth of the external memory is increased and a high-speed memory is required as the external memory.

To address this problem, a high-capacity memory with an embedded system LSI (Embedded DRAM) is now in practical use, and a technique for reducing external memory access by utilizing an internal memory as well as the external memory is being developed.

Patent Reference 2 discloses a technique of enhancing processing efficiency of motion estimation in the coding processing of MPEG by writing data used for motion estimation to both the internal and external memories, and placing necessary data in the wide-band internal memory (see Patent Reference 2).

Patent Reference 1: Japanese Unexamined Patent Application Publication No. 2004-215049
Patent Reference 2: Japanese Unexamined Patent Application Publication No. 2002-218474
Non-Patent Reference 1: ITU-T recommendation H.262 "Information technology—Generic coding of moving pictures and associated audio information: Video"
Non-Patent Reference 2: ITU-T recommendation H.264 "Advanced video coding for generic audiovisual services"

DISCLOSURE OF INVENTION

Problems that Invention is to Solve

Patent Reference 2 discloses a structure having an internal frame memory for storing reference pictures in encoding processing.

When such a structure is adapted for decoding processing, in the H.264 standard, decoded data which is picture data necessary for inter-frame prediction is written to the internal memory for use in inter-frame prediction, and is also written to the external memory at the same time to be outputted to an external device such as a display.

In this case, the internal memory stores a currently decoded picture and a picture which can be referred to and is needed by the currently decoded picture, which causes a problem of increased capacity necessary for the internal memory.

In consideration to the above conventional problem, an object of the present invention is to provide a moving picture decoding apparatus that decodes coded pictures using inter-frame prediction, and that efficiently performs decoding without increasing the storage capacity necessary for the decoding.

Means to Solve the Problems

In order to solve the above conventional problem, the moving picture decoding apparatus of the present invention is a moving picture decoding apparatus that decodes moving picture data including a coded picture which has been coded according to a coding scheme of performing inter-frame prediction with reference to a maximum of n pictures, where n is an integer equal to or greater than 2, the moving picture decoding apparatus comprising: a decoding unit configured to decode the coded picture included in the moving picture data using the inter-frame prediction; a first storage unit configured to store a decoded picture generated by the decoding unit, for external output of the decoded picture; a second storage unit configured to store n decoded pictures which can be referred to for the inter-frame prediction by the decoding unit; and a transfer unit configured to transfer the decoded picture from the first storage unit to the second storage unit so that the n decoded pictures are stored in the second storage unit before the decoding unit starts decoding one coded picture.

With this structure, before the decoding starts, the maximum of n decoded pictures which are to be referred to by the decoding unit are transferred from the first storage unit to the second storage unit to which a reference is made when the decoding unit performs inter-frame prediction.

As a result, unlike the conventional art, it is unnecessary, while a coded picture is decoded, to accumulate in the second storage unit data of the result of the decoding.

In other words, the moving picture decoding apparatus of the present invention stores only the decoded pictures which can be referred to by a coded picture to be decoded, in the second storage unit to which a reference is made for inter-frame prediction. This makes it possible to prevent an increase in the necessary capacity of the second storage unit.

To be more specific, the capacity of the second storage unit can be such that it stores only the n decoded pictures.

Further, accessing only the second storage unit is sufficient for the decoding unit in obtaining all the decoded pictures which should be referred to. Consequently, efficient decoding is possible.

For example, in the case of implementing the decoding unit as one of the functions of an integrated circuit, it is possible to use an internal memory of the integrated circuit as the second storage unit without increasing the capacity of the internal memory. This enables high-speed decoding with inter-frame prediction.

Furthermore, it may be that the first storage unit is configured to sequentially accumulate, while the decoding unit decodes the coded picture, decoded data generated by the decoding unit, so as to store all data of the decoded picture which is a result of decoding the coded picture, and the transfer unit is configured to start a transfer of one of the n decoded pictures between completion of decoding a coded picture which immediately precedes the one coded picture in decoding order and start of decoding the one coded picture.

This structure makes it possible to transfer the decoded picture to the second storage unit while the decoding is not performed, that is, while the decoding unit is not transferring decoded data to the first storage unit. This allows the moving picture decoding apparatus to operate efficiently.

Moreover, it may be that in the transfer, the transfer unit is configured to transfer, from the first storage unit to the second storage unit, a decoded picture which is a result of decoding the immediately preceding picture, as one of the n decoded pictures.

As described, by transferring, after a picture is decoded, only the data of the decoded picture from the first storage unit to the second storage unit, the amount of data transferred from the first storage unit to the second storage unit can be reduced to a greater extent.

In addition, it may be that the moving picture decoding apparatus of the present invention further comprises a determination unit configured to determine whether or not each of a plurality of decoded pictures is to be referred to for decoding the one coded picture, wherein the transfer unit is configured to transfer a decoded picture from the first storage unit to the second storage unit so that n decoded pictures are stored in the second storage unit before the decoding of the one coded picture starts, the n decoded pictures being determined by the determination unit to be referred to for decoding the one coded picture.

With this structure, only the decoded picture which is actually referred to is stored in the second storage unit. Thus, the processing load of the data transfer can be reduced.

Further, it may be that the transfer unit is configured to transfer, from the first storage unit to the second storage unit, only a decoded picture, among the n decoded pictures, which is not stored in the second storage unit, the n decoded pictures being determined by the determination unit to be referred to for decoding the one coded picture.

With this structure, the transfer unit does not transfer, from the first storage unit to the second storage unit, the decoded picture which is already stored in the second storage unit. In other words, the processing efficiency of the data transfer improves.

Furthermore, it may be that the decoding unit and the second storage unit are included in a same integrated circuit, and the first storage unit is provided outside the integrated circuit.

This structure makes it possible to implement a moving picture decoding apparatus that performs high-speed decoding by using an internal memory of an integrated circuit as the second storage unit.

Moreover, it may be that the coded picture included in the moving picture data is data of a picture of 1920×1080 pixels coded according to the coding scheme, the coding scheme is a coding scheme of performing inter-frame prediction with reference to a maximum of 4 pictures defined by an H.264 standard, and the decoding unit is configured to decode the coded picture with reference to one or more decoded pictures among 4 decoded pictures transferred from the first storage unit to the second storage unit.

This structure enables a moving picture decoding apparatus that decodes moving picture data which has been compress-coded with high efficiency according to the H.264 standard and that performs decoding appropriately without increasing a storage capacity necessary for the decoding.

Furthermore, the reproduction apparatus of the present invention is a reproduction apparatus that reproduces moving picture data, the reproduction apparatus comprising: a moving picture decoding apparatus of the present invention; an input unit configured to receive an input of the moving picture data and to supply the received data to the moving picture decoding apparatus; and a display unit configured to sequentially display a plurality of decoded pictures outputted from the first storage unit.

This enables realization of a reproduction apparatus which efficiently decodes and reproduces moving picture data without increasing a storage capacity necessary for the decoding.

Moreover, the moving picture decoding apparatus of the present invention is a moving picture decoding apparatus that decodes moving picture data including a coded picture which has been coded according to a coding scheme of performing inter-frame prediction with reference to a maximum of n pictures, where n is an integer equal to or greater than 2, the moving picture decoding apparatus comprising: a decoding unit configured to decode the coded picture included in the moving picture data using the inter-frame prediction; a first storage unit configured to store a decoded picture generated by the decoding unit, for external output of the decoded picture; a second storage unit configured to store n decoded pictures which can be referred to for the inter-frame prediction by the decoding unit; and a transfer unit configured to transfer, from the second storage unit to the first storage unit, a decoded picture which should be displayed after the decoded picture stored in the first storage unit is displayed, among one or more decoded pictures stored in the second storage unit.

With this structure, it is possible to store in the second storage unit the decoded picture which is to be referred to, and to transfer the decoded picture from the second storage unit to the first storage unit when a picture is outputted.

As a result, it is possible to obtain the reference picture only by accessing the second storage unit when decoding each coded picture, and to reduce the necessary capacity of the first storage unit to an extent greater than the conventional art.

It is to be noted that the present invention may be realized as an integrated circuit having characteristic structural elements of the moving picture decoding apparatus according to the present invention. In that case, an internal memory included in the integrated circuit can be used as the second storage unit, and an external memory provided outside the integrated circuit can be used as the first storage unit.

In addition, the present invention may be realized as: a moving picture decoding method having, as steps, characteristic structural elements of the moving picture decoding apparatus according to the present invention; a program for causing a computer to execute the steps; and as a recording medium recorded with the program.

The program may be distributed via a transmission medium such as the Internet or a recording medium such as a DVD.

Effects of the Invention

The moving picture decoding apparatus of the present invention stores, in the second storage unit to which a reference is made, only a picture which can be referred to by a coded picture to be decoded. This prevents a capacity increase of the second storage unit.

The present invention provides a moving picture decoding apparatus and a moving picture decoding method for decoding coded pictures using inter-frame prediction and for efficiently performing decoding processing without increasing a storage capacity necessary for the decoding.

Figure 1:
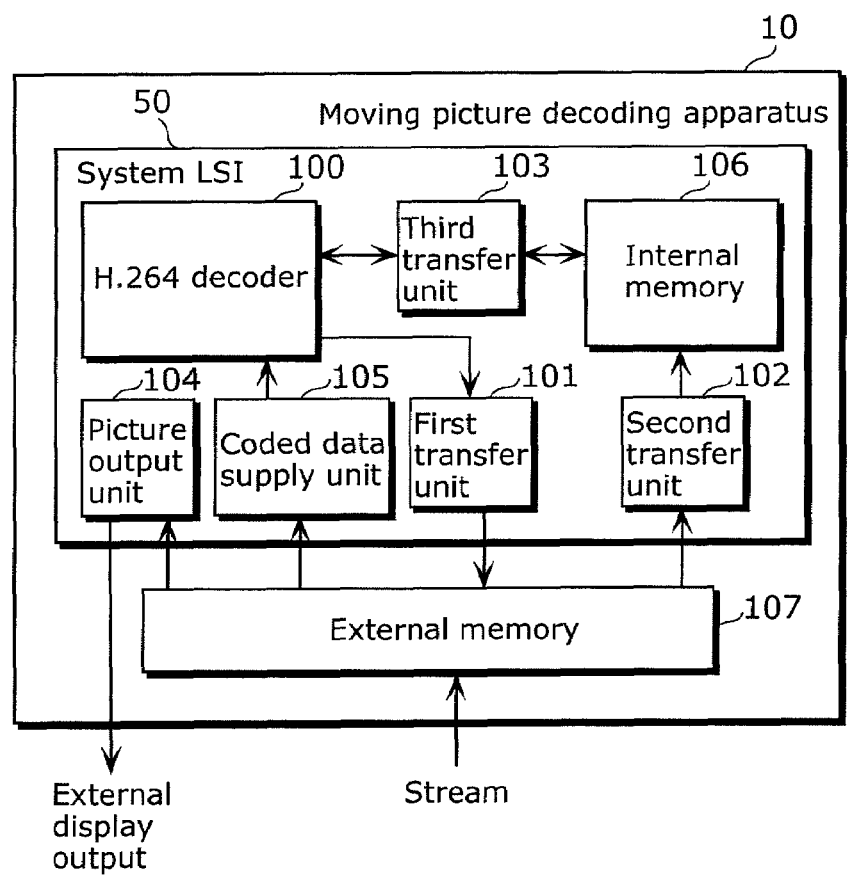
FIG. 1 is a functional block diagram showing the fundamental, functional structure of a moving picture decoding apparatus of Embodiment 1 according to the present invention.

NUMERICAL REFERENCES 10, 20, 30 Moving picture decoding apparatus
50, 60, 70 System LSI
100, 600, 900 H.264 decoder
101, 601, 901 First transfer unit
102, 602, 902 Second transfer unit
103, 603, 903 Third transfer unit
104, 604, 904 Picture output unit
105, 605, 905 Coded data supply unit
106, 606, 906 Internal memory
107, 608, 908 External memory
200 Coded stream buffer
201 Variable-length decoding unit
202 Inverse quantization unit
203 Inter-frame prediction unit
204 Intra-frame prediction unit
205 Deblocking filter unit
206 Decoded picture buffer
607, 907 Determination unit
1000 Reproduction apparatus
1100 Circuit substrate
1105 Display unit
1110 Stream input unit
1111 External output unit

BEST MODE FOR CARRYING OUT THE INVENTION

Hereinafter, embodiments of the present invention shall be described with reference to the drawings.

Embodiment 1

FIG. 1 is a functional block diagram showing the fundamental, functional structure of a moving picture decoding apparatus 10 according to Embodiment 1 of the present invention.

Hereinafter, with reference to FIG. 1, the structure of the moving picture decoding apparatus 10 according to Embodiment 1 shall be described.

As shown in FIG. 1, the moving picture decoding apparatus 10 of Embodiment 1 includes a system LSI 50 and an external memory 107 provided outside the system LSI 50.

The system LSI 50 includes an H.264 decoder 100, a first transfer unit 101, a second transfer unit 102, a third transfer unit 103, a picture output unit 104, a coded data supply unit 105, and an internal memory 106 used for inter-frame prediction.

That is to say, these elements are included in one Large Scale Integration (LSI) to structure the system LSI 50.

The external memory 107 is an example of the first storage unit of the moving picture decoding apparatus according to the present invention, and is a memory for storing coded picture data and decoded picture data. In detail, it is a memory that holds a coded picture to be decoded and a decoded picture generated by the H.264 decoder 100 for external output of the decoded picture.

The internal memory 106 is an example of the second storage unit of the moving picture decoding apparatus according to the present invention, and is a memory for storing n decoded pictures which can be referred to when the H.264 decoder 100 performs inter-frame prediction.

Here, n is the maximum number of pictures which can be referred to, determined by the coding standard. In the present embodiment, four High Definition (HD) pictures (1920×1080 pixels) can be stored.

The coded data supply unit 105 is a processing unit that reads the coded data stored in the external memory 107 and supplies it to the H.264 decoder 100.

The H.264 decoder 100 is an example of the decoding unit of the moving picture decoding apparatus according to the present invention, and is a processing unit that decodes coded pictures included in moving picture data by using inter-frame prediction.

More specifically, the H.264 decoder 100 is a circuit for decoding H.264 coded streams using inter-frame prediction algorithm. Details of the H.264 decoder 100 shall be described later with reference to FIG. 2.

The first transfer unit 101 is a processing unit that transfers to the external memory 107 data of decoded pictures generated by the H.264 decoder 100.

It should be noted that the term "transfer" in the present Description and Claims is used as a broad concept including the term "copy" for making a copy of information at a location while leaving the information at its original location.

The second transfer unit 102 is an example of the transfer unit of the moving picture decoding apparatus according to the present invention, and is a processing unit that makes a copy, in the internal memory 106, of decoded picture data stored in the external memory 107.

The third transfer unit 103 is a processing unit that makes a copy, in the H.264 decoder 100, of decoded picture data stored in the internal memory 106.

It is to be noted that the first transfer unit 101 is an example of the first transfer unit of the integrated circuit according to the present invention, and the second transfer unit 102 is an example of the second transfer unit of the integrated circuit according to the present invention.

As described above, each of the first transfer unit 101, the second transfer unit 102, and the third transfer unit 103 is used for copying data between the structural elements. Further, the decoded picture stored in the internal memory 106 is referred to when a subsequent picture is decoded.

In detail, by receiving from the second transfer unit 102 decoded picture data stored in the external memory 107, the internal memory 106 stores decoded picture data to be used for inter-frame prediction.

In the present embodiment, all the decoded pictures are copied from the external memory 107 to the internal memory 106 by the second transfer unit 102, which is performed before decoding of the next coded picture starts.

Furthermore, when the H.264 decoder 100 decodes a picture using inter-frame prediction, the third transfer unit 103 makes a copy, in the H.264 decoder 100, of data to be actually referred to, out of the data stored in the internal memory 106.

The picture output unit 104 is a processing unit that reads decoded picture data stored in the external memory 107 and outputs the data to an external display. With this, the decoded picture is displayed on the external display connected to the moving picture decoding apparatus 10.

Figure 2:
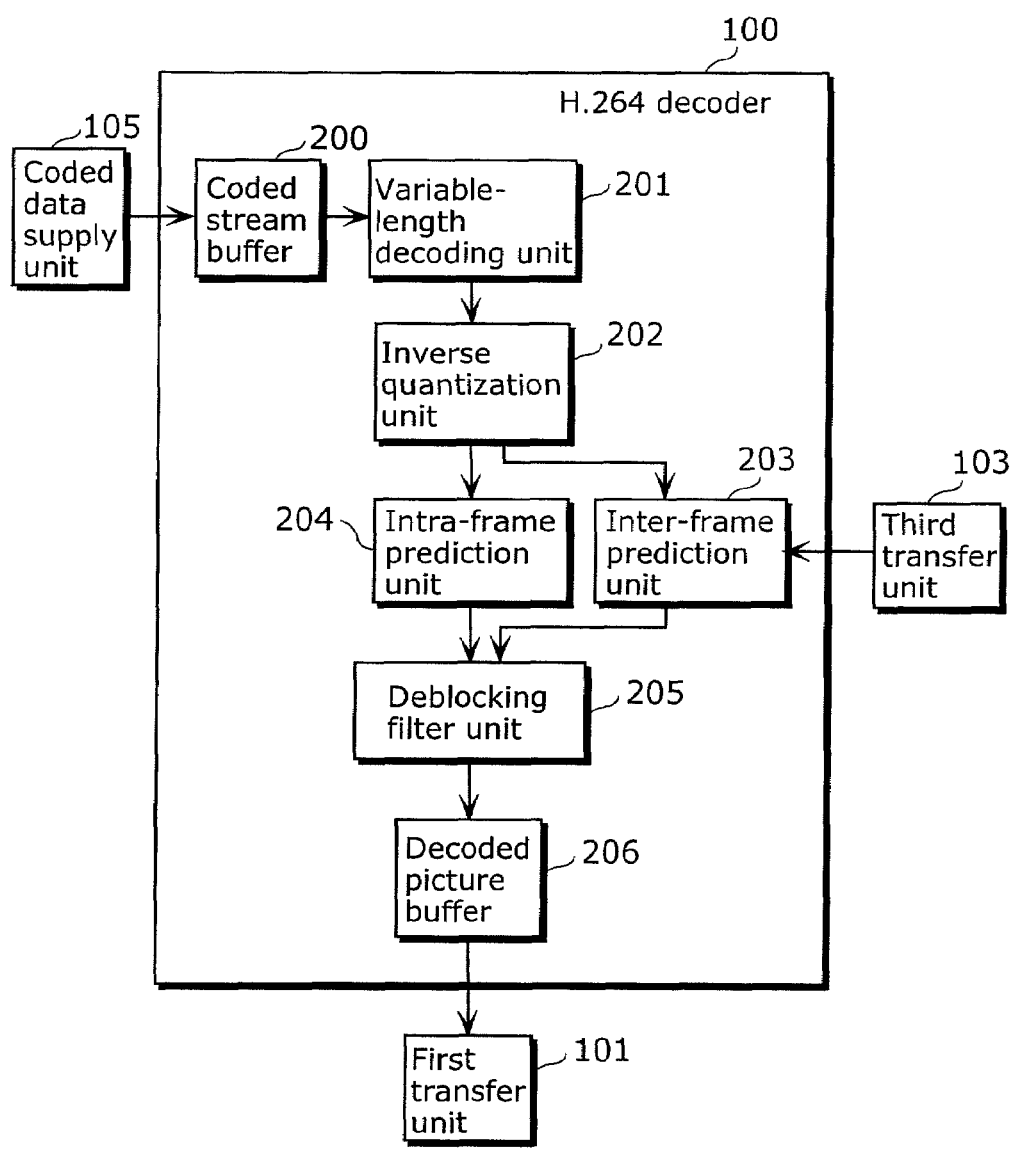
FIG. 2 is a functional block diagram showing the fundamental, functional structure of an H.264 decoder.

Next, with reference to FIG. 2, the structure of the H.264 decoder 100 shall be described.

FIG. 2 is a functional block diagram showing the fundamental, functional structure of the H.264 decoder 100.

As shown in FIG. 2, the H.264 decoder 100 includes a coded stream buffer 200 that stores a coded stream, a variable-length decoding unit 201, an inverse quantization unit 202, an inter-frame prediction unit 203, an intra-frame prediction unit 204, a deblocking filter unit 205, and a decoded picture buffer 206 to which a decoded picture is written.

The coded stream buffer 200 is a buffer that temporarily holds moving picture data inputted. To be more specific, an H.264 coded stream is inputted to the coded stream buffer 200.

The variable-length decoding unit 201 is a processing unit that performs variable-length decoding on the coded stream inputted. The inverse quantization unit 202 is a processing unit that performs inverse quantization and inverse integer conversion on data generated by the variable-length decoding unit 201.

The inter-frame prediction unit 203 is a processing unit that performs inter-frame prediction, and the intra-frame prediction unit 204 is a processing unit that performs intra-frame prediction.

More specifically, based on a value generated by the variable-length decoding unit 201, it is determined whether or not to perform inter-frame prediction or intra-frame prediction for decoding the picture. According to the determination result, either the inter-frame prediction unit 203 or the inter-frame prediction unit 204 performs prediction.

The deblocking filter unit 205 is a processing unit that filters data generated by either the inter-frame prediction unit 203 or the inter-frame prediction unit 204.

The decoded picture buffer 206 is a buffer that temporarily holds the filtered data.

The data stored in the decoded picture buffer 206 is transferred to the external memory 107 by the first transfer unit 101. That is to say, the external memory 107 is used also for storing pictures decoded by the H.264 decoder 100.

Next, a description shall be given of a procedure of the decoding processing performed by the H.264 decoder 100 of the moving picture decoding apparatus 10 having the structure shown in FIGS. 1 and 2.

When moving picture data which has been coded according to the H.264, that is, a target to be decoded, is in the external memory 107, the moving picture data is first supplied to the H.264 decoder 100 by the coded data supply unit 105.

The H.264 decoder 100 stores in the coded stream buffer 200 the moving picture data received from the coded data supply unit 105, and performs variable-length decoding using the variable-length decoding unit 201.

In the case where it is judged, based on the information decoded through the variable-length decoding, that the picture to be decoded is of a picture type for which inter-frame prediction is not performed, the inverse quantization unit 202 performs inverse quantization and inverse integer conversion.

In the case where the picture to be decoded is a picture on which inter-frame prediction is performed and a macroblock (hereinafter also referred to as "MB"), a unit of decoding, is an MB on which inter-frame prediction is performed, decoded picture data is obtained using the third transfer unit 103 from the internal memory 106 which stores the decoded picture data. The data obtained is inputted to the inter-frame prediction unit 203.

The inter-frame prediction unit 203 performs inter-frame prediction using the decoded picture data. The data outputted from the inter-frame prediction unit 203 undergoes the deblocking filter unit 205 and the resultant is stored in the decoded picture buffer 206.

In the case where the MB to be decoded is an MB on which intra-frame prediction is performed, the intra-frame prediction unit 204 performs intra-frame prediction and then the decoded data undergoes the deblocking filter unit 205 and the resultant is stored in the decoded picture buffer 206.

The data stored in the decoded picture buffer 206 is transferred to the external memory 107 by the first transfer unit 101.

Here, after the H.264 decoder 100 decodes a picture, the first transfer unit 101 does not transfer data while the H.264 decoder 100 is not in operation.

Further, when the decoded picture data is written to the external memory 107, picture data which may be referred to in the next decoding processing is copied to the internal memory 106 using the second transfer unit 102 before decoding of the next coded data starts, that is, while the H.264 decoder 100 is not performing decoding processing.

In the present embodiment, all the decoded pictures are transferred from the external memory 107 to the internal memory 106 as pictures which may be referred to.

Further, whether or not the decoded picture transferred to the internal memory 106 is necessary is determined based on information in a picture header of the subsequent coded picture to be decoded. As a result of the determination, a decoded picture determined not to be referred to thereafter, that is, determined as unnecessary to be retained, is deleted from the internal memory 106.

Through this processing, as described, when an MB appears on which inter-frame prediction is performed in the subsequent decoding processing, reference picture data necessary for the inter-frame prediction is in the internal memory 106 to which a reference is made for the inter-frame prediction.

Therefore, the H.264 decoder 100 does not need to access the external memory 107. Generally, an internal memory of a system LSI can be generally accessed faster than when accessing an external memory.

Thus, the moving picture decoding apparatus 10 of the present embodiment can perform inter-frame prediction by accessing only the internal memory 106 provided inside the system LSI 50, without using the high-speed external memory 107.

It should be noted that the decoded pictures stored in the external memory 107 are read from the external memory 107 by the picture output unit 104 and then outputted to the external display. This allows moving pictures including the outputted pictures to be displayed on the external display.

Figure 3:
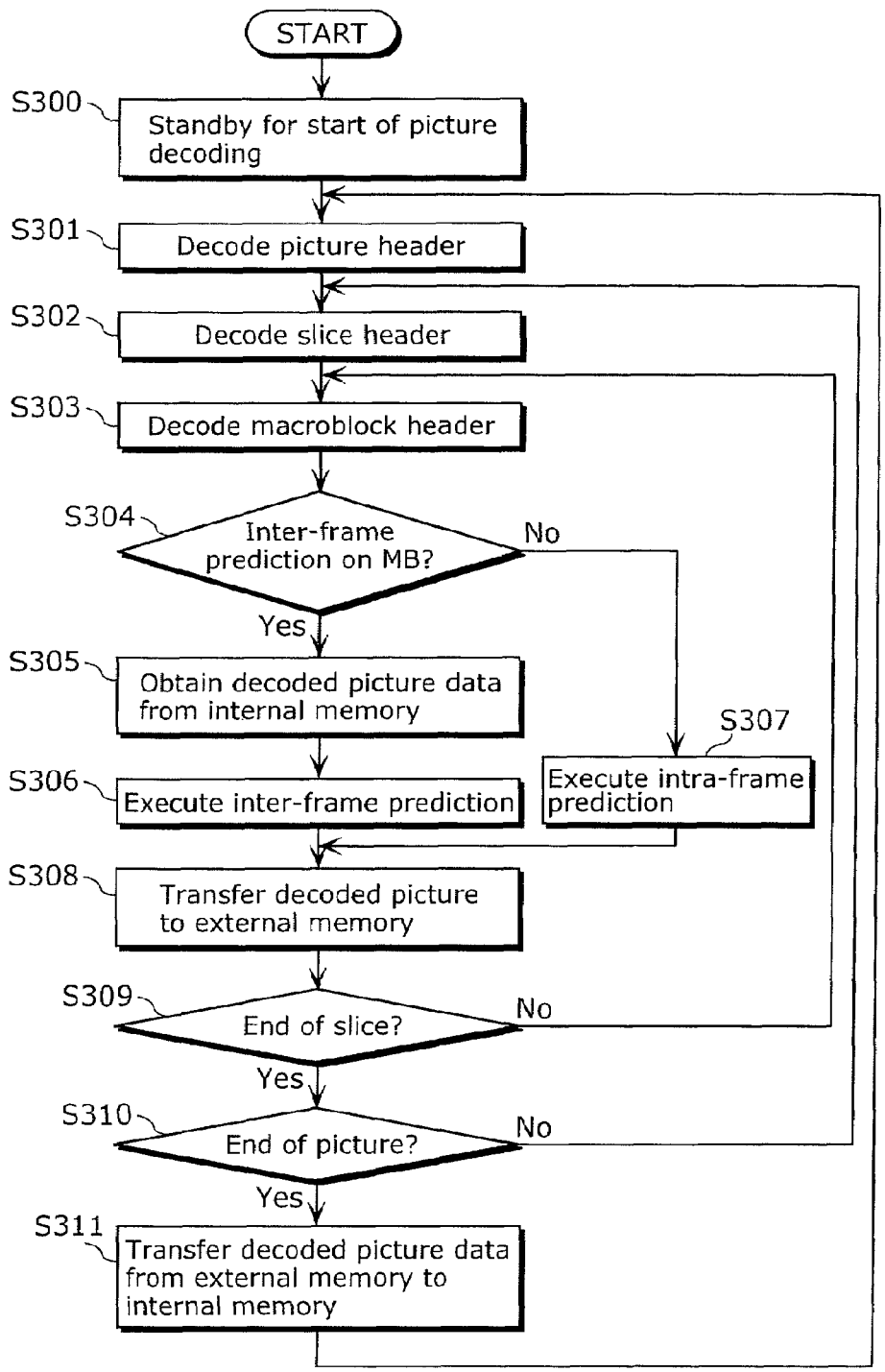
FIG. 3 is a flowchart showing a flow of processing performed by a moving picture decoding apparatus of Embodiment 1.

With reference to the flowchart of FIG. 3, the flow of the above decoding processing shall be described.

FIG. 3 is a flowchart showing a flow of processing performed by the moving picture decoding apparatus 10 of Embodiment 1.

Initially, the H.264 decoder 100 is in an initial state of standby for a start of picture decoding (S300).

Picture decoding starts in this state in response to an instruction from a user, for example. More precisely, the variable-length decoding unit 201 first decodes data called a picture header in which information characterizing all the pictures included in a coded stream is stored (S301).

When the decoding of the picture header is finished, data called a slice header is decoded next (S302).

In the H.264 standard, a picture is divided into units called slices in some cases, in view of error-resistance in communication channels.

Figure 4:
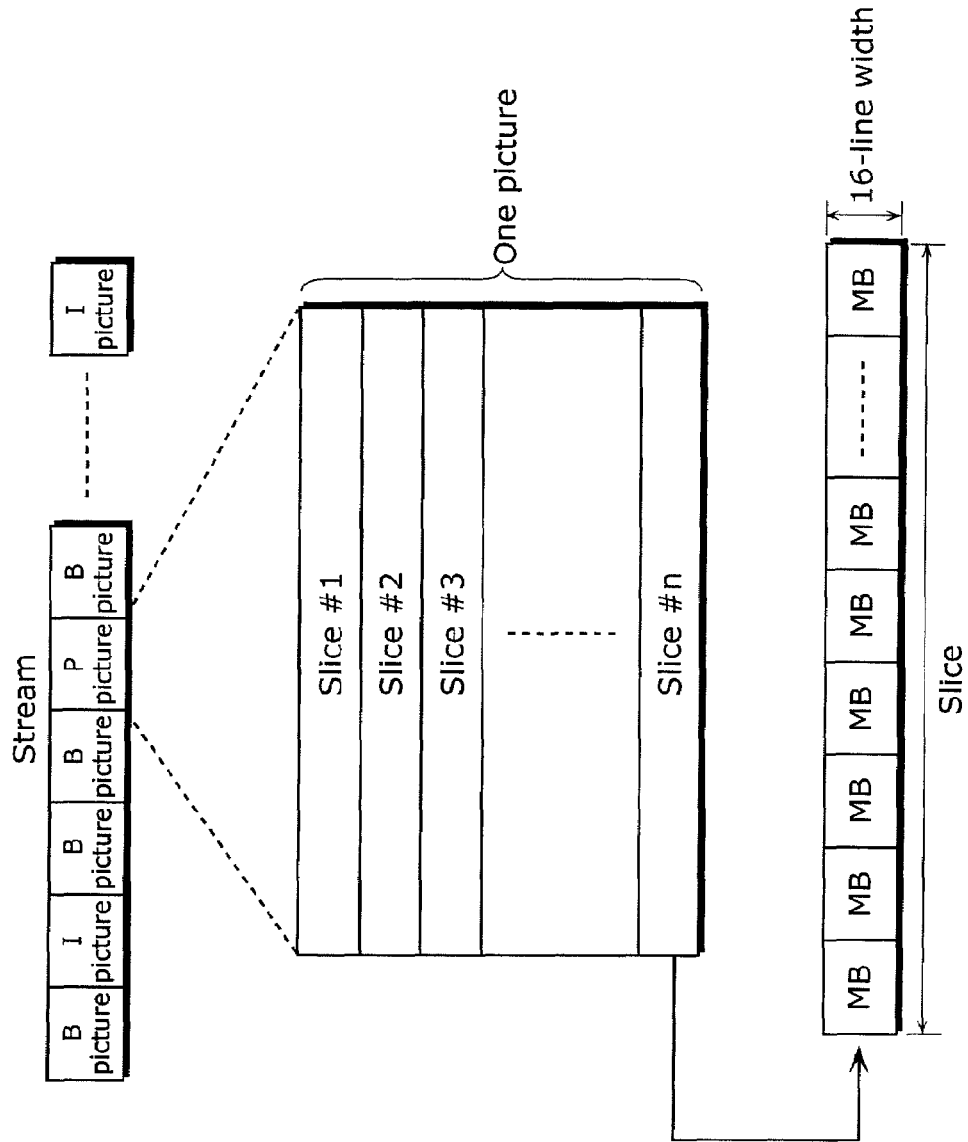
FIG. 4 illustrates a hierarchical structure of an H.264 stream.

FIG. 4 illustrates a hierarchical structure of an H.264 stream.

As shown in FIG. 4, slices are generated by dividing a picture into strips, that is, slices #1 to #n, and each slice is made up of plural macroblocks (MBs).

An MB includes 16×16 pixels and is a unit of coding and decoding. In other words, a slice typically represents a strip of MBs each of which has 16 lines.

It is to be noted that a single slice may be made up of plural consecutive lines. In this case, a slice is made up of a strip of 16×n MBs (n being a natural number). A slice header is provided at the head of a slice that includes plural MBs, and is data for which a parameter common to the macroblocks included in the slice is coded.

In the H.264 decoder 100, when the decoding of the slice header is finished, the variable-length decoding unit 201 starts decoding an MB header next (S303).

The MB header includes coded data that contains detailed information on the MB. By interpreting the data, it is possible to determine which of inter-frame prediction or intra-frame prediction is to be performed on the MB (S304).

If intra-frame prediction is to be performed on the MB, the intra-frame prediction unit 204 performs intra-frame prediction on the MB (S307). The data outputted from the intra-frame prediction unit 204 undergoes the deblocking processing by the deblocking filter unit 205, and the resultant is stored in the decoded picture buffer 206.

The data stored in the decoded picture buffer 206 is transferred to the external memory 107 by the first transfer unit 101 (S308).

On the other hand, if inter-frame prediction is to be performed on the MB, the H.264 decoder 100 obtains decoded picture data stored in the internal memory 106 by using the third transfer unit 103. Then, the inter-frame prediction unit 203 performs inter-frame prediction using the obtained decoded picture data (S306).

After the inter-frame prediction, the data outputted from the inter-frame prediction unit 203 undergoes the deblocking processing by the deblocking filter unit 205, and the resultant is stored in the decoded picture buffer 206.

The data stored in the decoded picture buffer 206 is transferred to the external memory 107 by the first transfer unit 101 (S308).

Also, after the MB is decoded, it is determined whether or not the MB is at the end of the slice to which the MB belongs (S309).

If the MB is not at the end of the slice (No in S309), the decoding processing continues on the subsequent MB. If the MB is at the end of the slice (Yes in S309), it is then determined whether or not the MB is at the end of the picture (S310).

If the MB is not at the end of the picture (No in S310), the decoding processing continues on the subsequent slice. If the MB is at the end of the picture (Yes in S310), the H.264 decoder 100 completes the decoding processing on the picture.

The above determinations (S309 and S310) are performed by the variable-length decoding unit 201, for example.

At the completion of the above series of processing, all the data decoded by the H.264 decoder 100 is in the external memory 107. That is to say, all the decoded data making up the picture is in the external memory 107.

In this manner, at the completion of the decoding processing, the decoded picture data written to the external memory 107 is transferred to the internal memory 106 by the second transfer unit 102 (S311). After the transfer, the H.264 decoder 100 starts decoding the next picture at a predetermined timing.

Thereafter, the above processing is repeated until there is an instruction from the user, for example, to finish reproduction of the moving picture data, or until the decoding processing on the entire moving picture data finishes.

Figure 5:
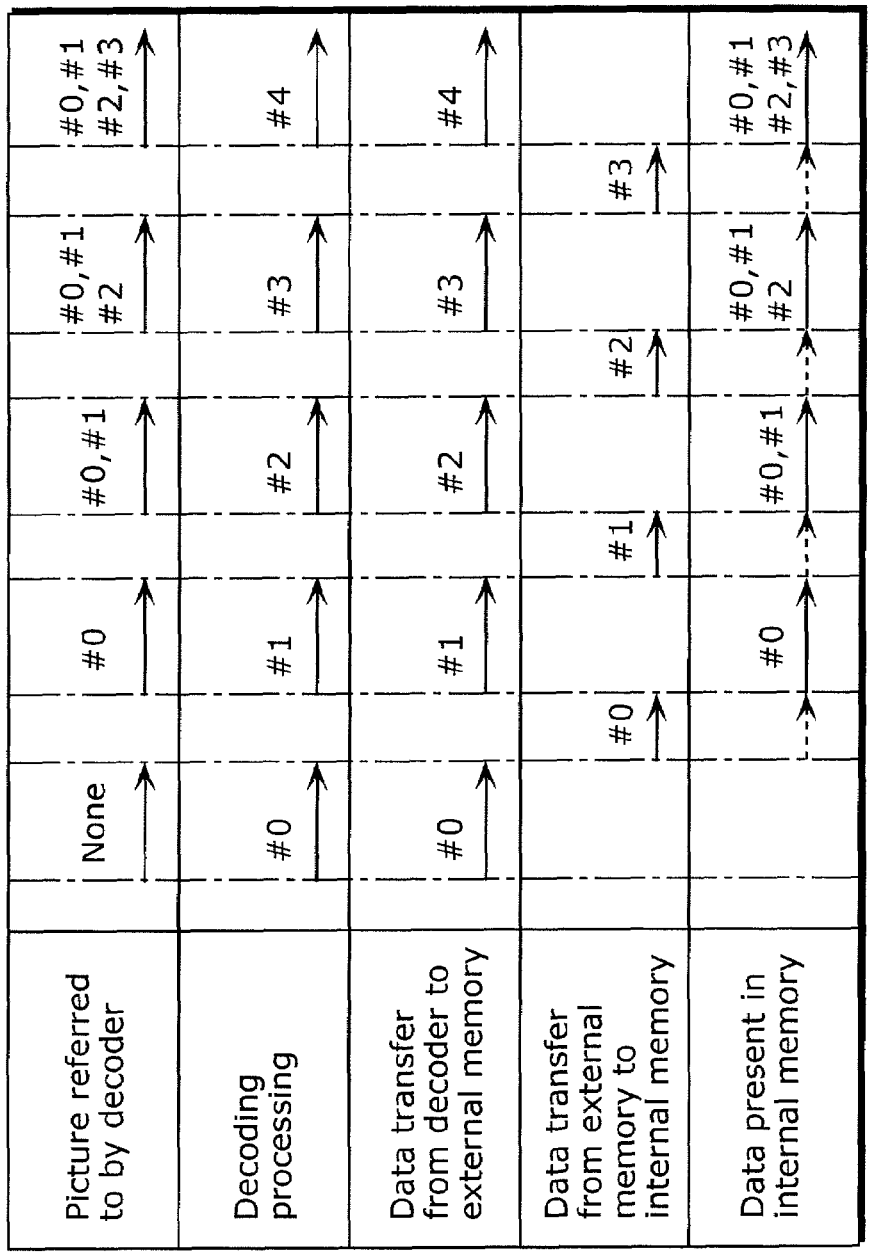
FIG. 5 illustrates an example of a timing diagram of decoding processing performed by a moving picture decoding apparatus of Embodiment 1.

FIG. 5 illustrates an example of a timing diagram of decoding processing performed by the moving picture decoding apparatus 10 of Embodiment 1. The numbers in the diagram such as "#0" are identification numbers of the respective pictures.

As described above, the moving picture decoding apparatus 10 repeatedly performs the processing of copying, from the external memory 107 to the internal memory 106, picture data which is to be used for inter-frame prediction after the picture is decoded.

By doing so, as shown in FIG. 5, all the decoded picture data necessary for decoding the subsequent picture is stored in the internal memory 106.

As a result, when decoding the subsequent picture, the moving picture decoding apparatus 10 can execute inter-frame prediction by accessing the internal memory 106 only.

It is to be noted that before the decoded picture #4 is transferred to the internal memory 106, one or more pictures that are not referred to in the subsequent processing are deleted among pictures #0 to #3.

Further, data is transferred from the external memory 107 to the internal memory 106 while the decoding processing is stopped. That is to say, unlike the conventional art, decoded data is not transferred to the internal memory 106 during the decoding processing. Therefore, the capacity of the internal memory 106 may be such that only the minimum amount of data necessary for inter-frame prediction can be stored.

It is to be noted that the H.264 standard defines levels to specify decoders' performance, complication of coded bitstreams, and so on. Further, depending on the level, it is specified to what extent the coding tools which are defined by the standard and are elemental techniques for the coding processing, are supported.

More specifically, at the level of supporting moving picture streams of 1920×1080 pixels that are supported by full high-definition televisions and optical discs such as Blu-ray discs, the H.264 standard specifies that a maximum of 4 decoded pictures can be referred to for inter-frame prediction.

For example, when the moving picture streams are to be decoded by the moving picture decoding apparatus 10 of Embodiment 1, the internal memory 106 may have a capacity for 4 pictures specified by the standard.

As described above, the moving picture decoding apparatus 10 of Embodiment 1 transfers a reference picture to be used for subsequent inter-frame prediction from the external memory 107 to the internal memory 106 while the repeatedly performed decoding processing is stopped.

In other words, with the moving picture decoding apparatus 10, the data transfer to the internal memory 106 is not performed while a coded picture is decoded, but only the data transfer to the external memory 107 is performed while then. Thereafter, when the decoding processing is completed, the decoded picture data is copied from the external memory 107 to the internal memory 106 before the next decoding processing starts.

As a result, the capacity of the internal memory can be reduced by 1 picture, compared to the case of writing currently decoded data to both the internal and external memories simultaneously as in the conventional moving picture decoding apparatus.

To be more specific, with the moving picture decoding apparatus 10 of the present embodiment, as shown in FIG. 5, the data present in the internal memory 106 while a picture #4, for example, is decoded is data of 4 pictures, that is, pictures #0 to #3. In other words, the capacity for 4 pictures is sufficient for the internal memory 106.

However, with the conventional moving picture decoding apparatus, data of decoded MBs is sequentially written to the internal memory while the picture #4 is decoded. This requires the internal memory to have a capacity for 5 pictures. Such a difference in the necessary capacities arises also while other pictures are decoded.

As described, the moving picture decoding apparatus 10 of the present embodiment does not increase the storage capacity necessary for the decoding processing, that is, the necessary capacity of the internal memory.

Furthermore, the decoded picture is transferred from the external memory 107 to the internal memory 106 while the decoding processing is stopped, that is, while the first transfer unit 101 does not transfer data to the external memory 107. Thus, the processing load on the moving picture decoding apparatus 10 for the data transfer is not increased unnecessarily.

In this manner, with the moving picture decoding apparatus 10 of Embodiment 1, the high speed of the decoding processing is ensured since all the reference pictures can be obtained from the internal memory 106.

In addition, by transferring the decoded picture written only to the external memory 107 to the internal memory 106 at a timing necessary for inter-frame prediction in the subsequent decoding processing, it is possible to reduce the necessary capacity of the internal memory 106 to an extent greater than the conventional art.

It should be noted that in the present embodiment, all the decoded pictures are copied from the external memory 107 to the internal memory 106.

For copying plural decoded pictures from the external memory 107 to the internal memory 106, sequential copying may start from data of pictures which are already in the internal memory 106 before the decoding performed immediately prior to the copying is finished.

Further, the sequential copying may start from data of a picture which has been decoded immediately previously in the decoding order.

In other words, it is sufficient as long as all the decoded pictures which may be referred to for decoding a coded picture are stored in the internal memory 106 before the decoding of the coded picture starts.

Further, the storing order is not limited to a particular order. Furthermore, plural decoded pictures may be transferred from the external memory 107 to the internal memory 106 in a single time period during which the decoding processing stops.

As the present embodiment illustrates, by copying only one decoded picture resulted from immediately preceding decoding processing from the external memory 107 to the internal memory 106 in each decoding-stopped time period, it is possible to reduce, to a greater extent, the amount of data transferred from the external memory 107 to the internal memory 106 at one time.

Further, in the present embodiment, as shown in FIG. 1, the first transfer unit 101, the second transfer unit 102, the third transfer unit 103, and the coded data supply unit 105 are included in the moving picture decoding apparatus 10 as separate functional blocks.

However, these elements are means for transferring data between the structural elements such as the internal memory 106 and the external memory 107. Thus, they may be implemented as a single functional block that performs their respective functions by time division. They may also be implemented as a single functional block that performs plural functions in parallel.

Embodiment 2

Figure 6:
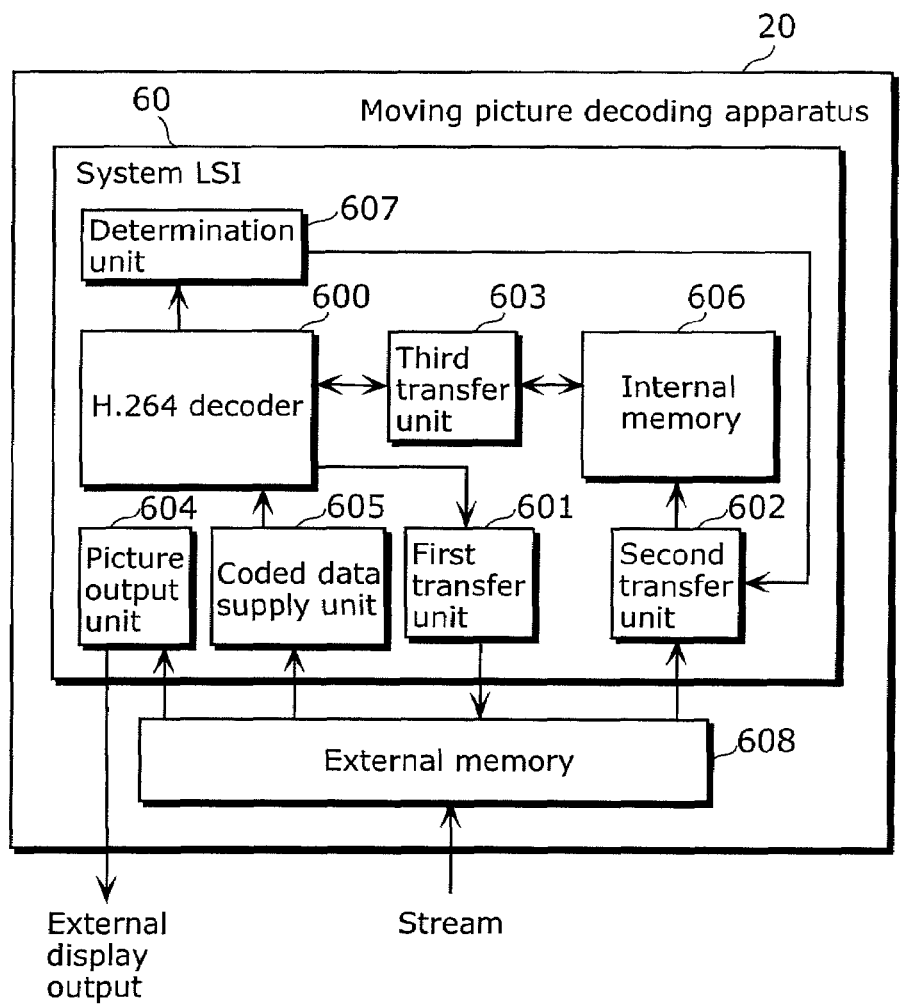
FIG. 6 is a functional block diagram showing the fundamental, functional structure of a moving picture decoding apparatus of Embodiment 2 according to the present invention.

FIG. 6 is a functional block diagram showing the fundamental, functional structure of a moving picture decoding apparatus 20 of Embodiment 2 according to the present invention.

With reference to FIG. 6, the structure of the moving picture decoding apparatus 20 of Embodiment 2 shall be described.

As shown in FIG. 6, the moving picture decoding apparatus 20 includes a determination unit 607 in addition to the structural elements of the moving picture decoding apparatus 10 of Embodiment 1.

In other words, the moving picture decoding apparatus 20 includes a system LSI 60 in which plural functions are integrated and an external memory 608 provided outside the system LSI 60.

The system LSI 60 includes an H.264 decoder 600, a first transfer unit 601, a second transfer unit 602, a third transfer unit 603, a picture output unit 604, a coded data supply unit 605, an internal memory 606 used for inter-frame prediction, and the determination unit 607.

The determination unit 607 is a processing unit that determines whether or not each of decoded pictures is to be referred to for decoding a coded picture. In other words, the determination unit 607 undertakes a role of detecting a picture to be referred to by a subsequent picture.

More precisely, the determination unit 607 makes the determination based on information contained in a picture header obtained when a coded picture is decoded. A specific example of the determination shall be given later with reference to FIG. 8.

The role of each structural element other than the determination unit 607 is the same as in Embodiment 1, and thus a description thereof shall be omitted.

Figure 7:
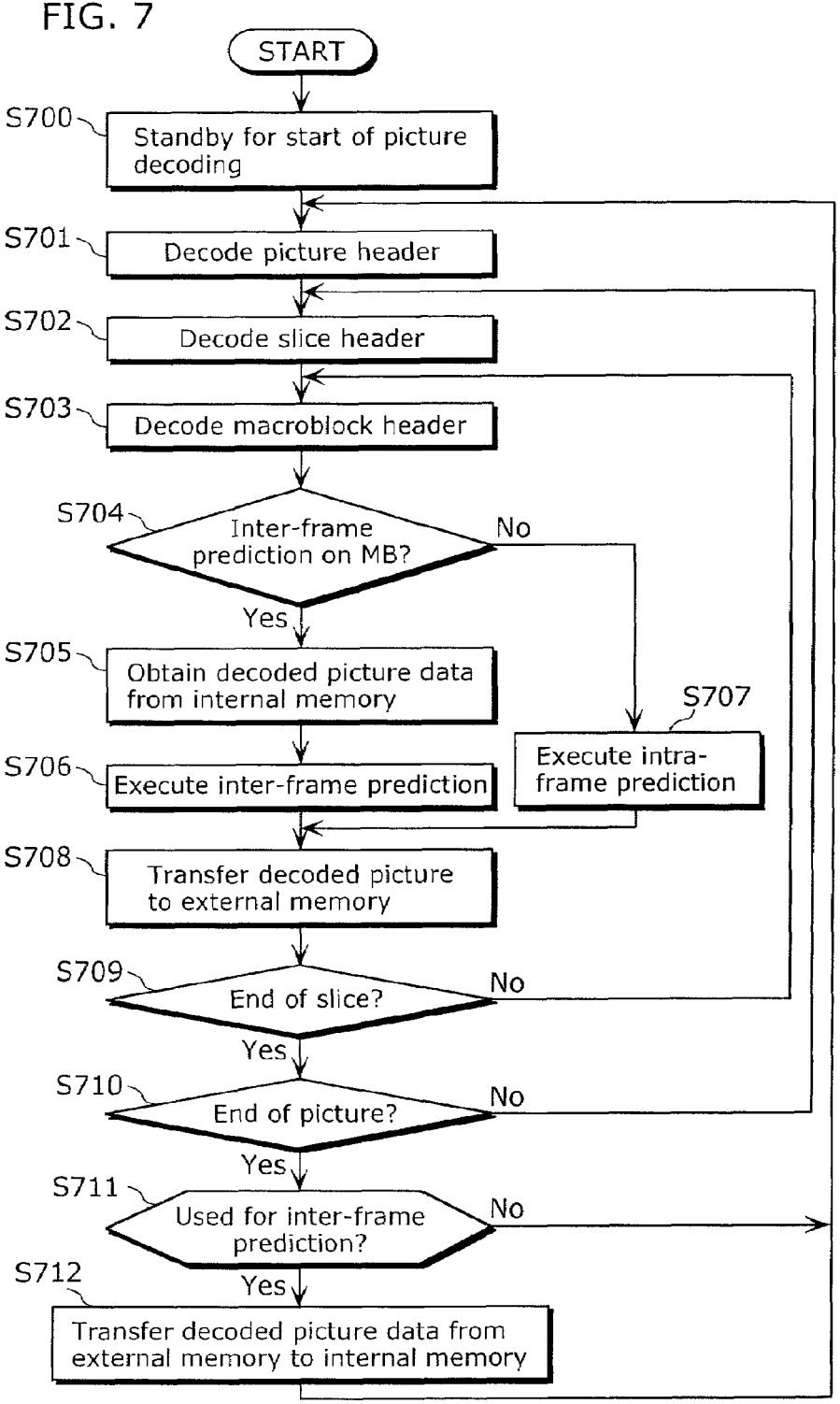
FIG. 7 is a flowchart showing a flow of processing performed by a moving picture decoding apparatus of Embodiment 2.
Figure 8:
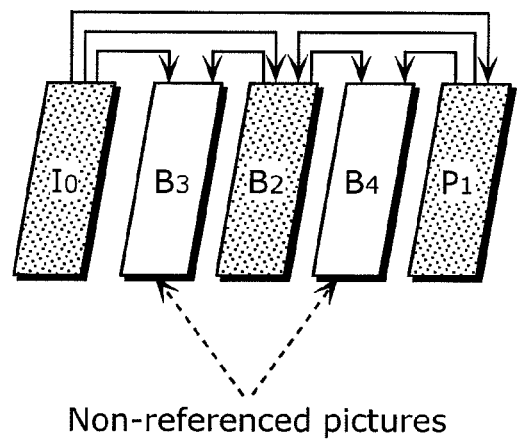
FIG. 8 illustrates an example of a sequence of consecutive pictures.
Figure 9:
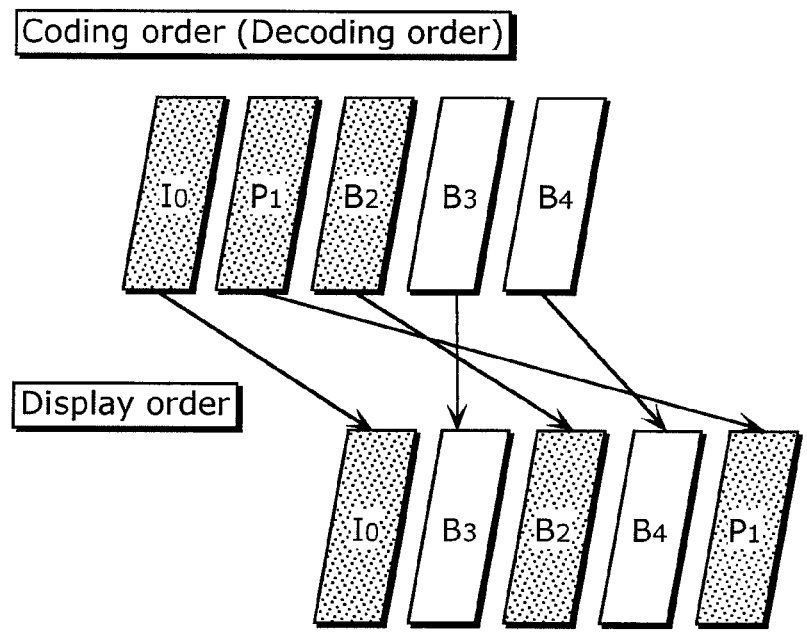
FIG. 9 illustrates a correspondence between a coding order and a display order of pictures.

Next, with reference to FIGS. 7 to 9, the operation of the moving picture decoding apparatus 20 of Embodiment 2 shall be described.

FIG. 7 is a flowchart showing a flow of processing performed by the moving picture decoding apparatus 20 of Embodiment 2.

As shown in FIG. 7, the basic flow of processing performed by the moving picture decoding apparatus 20 of Embodiment 2 is the same as that of the moving picture decoding apparatus 10 of Embodiment 1 shown in FIG. 3.

That is to say, the processing from being on standby for a start of picture decoding (S700) to the determination as to whether or not a decoded MB is at the end of the picture (S710) in FIG. 7 corresponds to the processing (S300 to S310) in FIG. 3.

However, with the moving picture decoding apparatus 20 of Embodiment 2, the determination unit 607 determines whether or not decoded picture data is to be used for inter-frame prediction, in the case where the decoded MB is at the end of the picture (Yes in S710).

As a result of the determination, only the decoded picture determined to be used for inter-frame prediction is transferred from the external memory 608 to the internal memory 606.

This reduces the amount of data transferred from the external memory 608 to the internal memory 606.

With reference to FIGS. 8 and 9, a specific example of processing performed by the determination unit 607 for identifying a reference picture shall be described.

FIG. 8 illustrates an example of a sequence of consecutive pictures. The following description illustrates an example of a method for determining a reference picture in the H.264 decoding.

The index of each picture shown in FIG. 8 shall be described. Indices of I, P, and B indicate a picture type. Pictures denoted with I (I pictures) are pictures to which only intra-frame prediction is performed as a coding tool, and are pictures which can be decoded without using data of other pictures which have been decoded.

Pictures denoted with P (P pictures) are pictures on which inter-frame prediction is performed using decoded picture data, and there is a restriction that only 1 picture can be referred to.

Pictures denoted with B (B pictures) are pictures on which inter-frame prediction is performed as with P pictures, but 2 pictures can be referred to simultaneously.

The numbers written next to I, P, and B indicate the coding order. Coded streams are structured according to the coding order, and thus this order agrees with the decoding order.

However, since the order of outputting pictures is I0, B3, B2, B4, and P1, it is apparent that there is a need to rearrange the order according to a predetermined procedure when outputting decoded pictures.

In the example shown in FIG. 8, the P1 picture refers to the I0 picture, for example. The B2 picture refers to I0 and P1. The B3 picture refers to I0 and B2, and B4 refers to B2 and P1.

In the case of a stream having such a reference relationship between pictures, the pictures B3 and B4, for example, are non-referenced pictures that are not referred to for inter-frame prediction when other pictures are decoded. Since such pictures are not referred to after being decoded, the determination unit 607 determines that these pictures are not reference pictures.

More specifically, the picture header of each picture contains information indicating which picture should be kept for reference and which picture should be referred to. The determination unit 607 receives the information from the H.264 decoder 600, for example, to determine whether or not each picture is a reference picture.

As a result of the determination, the moving picture decoding apparatus 20 of the present embodiment does not copy the data of the pictures B3 and B4 stored in the external memory 608, in the internal memory 606.

FIG. 9 illustrates a correspondence between a coding order and a display order of pictures.

It should be noted that FIG. 9 illustrates a correspondence between a coding order and a display order of pictures having the reference relationship shown in FIG. 8.

As shown in FIG. 9, the I0 picture on which only intra-frame prediction is performed is first decoded, and then the P1 picture on which inter-frame prediction is performed is decoded with reference to the I0 picture.

It is apparent that the B2 picture is decoded subsequent to the decoding of the I0 and P1 pictures, since the B2 picture is decoded with reference to the I0 and P1 pictures.

The relationship between the decoding order and the display order of these pictures can be understood from information contained in the above mentioned picture header stored at the head of a picture.

Each of the I0, P1, and B2 pictures decoded so far is a picture referred to in inter-frame prediction.

Thus, with this structure, after the I0 picture is decoded and the resultant is written to the external memory 608, the data of I0 is transferred from the external memory 608 to the internal memory 606 by the second transfer unit 602 before the decoding of the P1 picture starts.

Likewise, when the decoding of the P1 picture completes, data of the P1 picture is transferred from the external memory 608 to the internal memory 606 before the decoding of B2 starts.

On the other hand, the determination unit 607 determines that B3 and B4 are not used in subsequent inter-frame prediction although the data of I0 and B2 is used as reference pictures for decoding B3 and the data of B2 and P1 is used as reference pictures for decoding B4. Thus, data of these decoded pictures is not transferred to the internal memory 606.

In this manner, the moving picture decoding apparatus 20 of Embodiment 2 can continue decoding pictures with only the data determined by the determination unit 607 as necessary stored in the internal memory 606. With such a procedure, the relationship between the decoding order and the display order becomes as shown in FIG. 9.

As described above, the moving picture decoding apparatus 20 of Embodiment 2 includes the determination unit 607 to determine whether or not a decoded picture should be copied from the external memory 608 to the internal memory 606 by the second transfer unit 602. This allows only the decoded picture data which is actually used in subsequent inter-frame prediction to be copied to the internal memory 606, which enables a reduction of the amount of data transferred.

Here, as stated above, the H.264 standard defines levels to specify decoders' performance and so on. Depending on the level, it is specified to what extent the coding tools defined by the standard are supported.

More specifically, as described above, at the level of supporting moving picture streams of 1920×1080 pixels that are supported by full high-definition televisions and optical discs such as Blu-ray discs, it is specified that a maximum of 4 decoded pictures can be used for inter-frame prediction.

For example, when the moving picture streams are to be decoded by the moving picture decoding apparatus 20 of Embodiment 2, the internal memory 606 may have a capacity for 4 pictures specified by the standard.

It is to be noted that the function of the determination unit 607 of determining whether or not each picture is to be referred to may be equipped by the H.264 decoder 600, for example. In this case, it is sufficient if the H.264 decoder 600 instructs the second transfer unit 602 to transfer only the decoded pictures which are to be referred to, from the external memory 608 to the internal memory 606.

Embodiment 3

Figure 10:
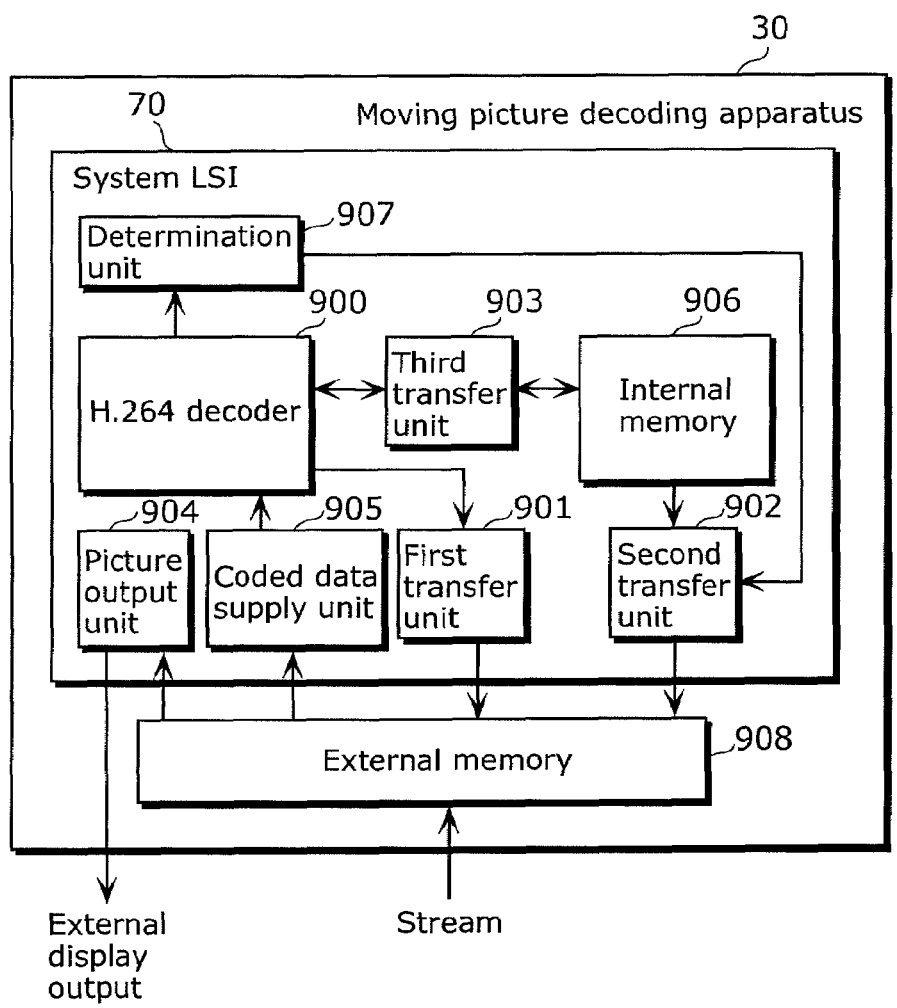
FIG. 10 is a functional block diagram showing the fundamental, functional structure of a moving picture decoding apparatus of Embodiment 3 according to the present invention.

FIG. 10 is a functional block diagram showing the fundamental, functional structure of a moving picture decoding apparatus 30 of Embodiment 3 according to the present invention.

With reference to FIG. 10, the structure of the moving picture decoding apparatus 30 of Embodiment 3 shall be described.

As shown in FIG. 10, the moving picture decoding apparatus 30 has the same structure as that of the moving picture decoding apparatus 20 of Embodiment 2.

In other words, the moving picture decoding apparatus 30 includes a system LSI 70 in which plural functions are integrated and an external memory 908 provided outside the system LSI 70.

The system LSI 70 includes an H.264 decoder 900, a first transfer unit 901, a second transfer unit 902, a third transfer unit 903, a picture output unit 904, a coded data supply unit 905, an internal memory 906 used for inter-frame prediction, and a determination unit 907.

As shown, the moving picture decoding apparatus 30 of Embodiment 3 is the same as the moving picture decoding apparatus 20 of Embodiment 2 in terms of the structure.

However, the moving picture decoding apparatus 30 of Embodiment 3 is different from the moving picture decoding apparatus 10 of Embodiment 1 and the moving picture decoding apparatus 20 of Embodiment 2 in that the second transfer unit 902 transfers decoded pictures from the internal memory 906 to the external memory 908.

This feature permits the moving picture decoding apparatus 30 of Embodiment 3 to reduce the capacity of the external memory 908.

It is to be noted that the basic role of each structural element is the same as that in Embodiments 1 and 2, and thus the description thereof shall be omitted.

Figure 11:
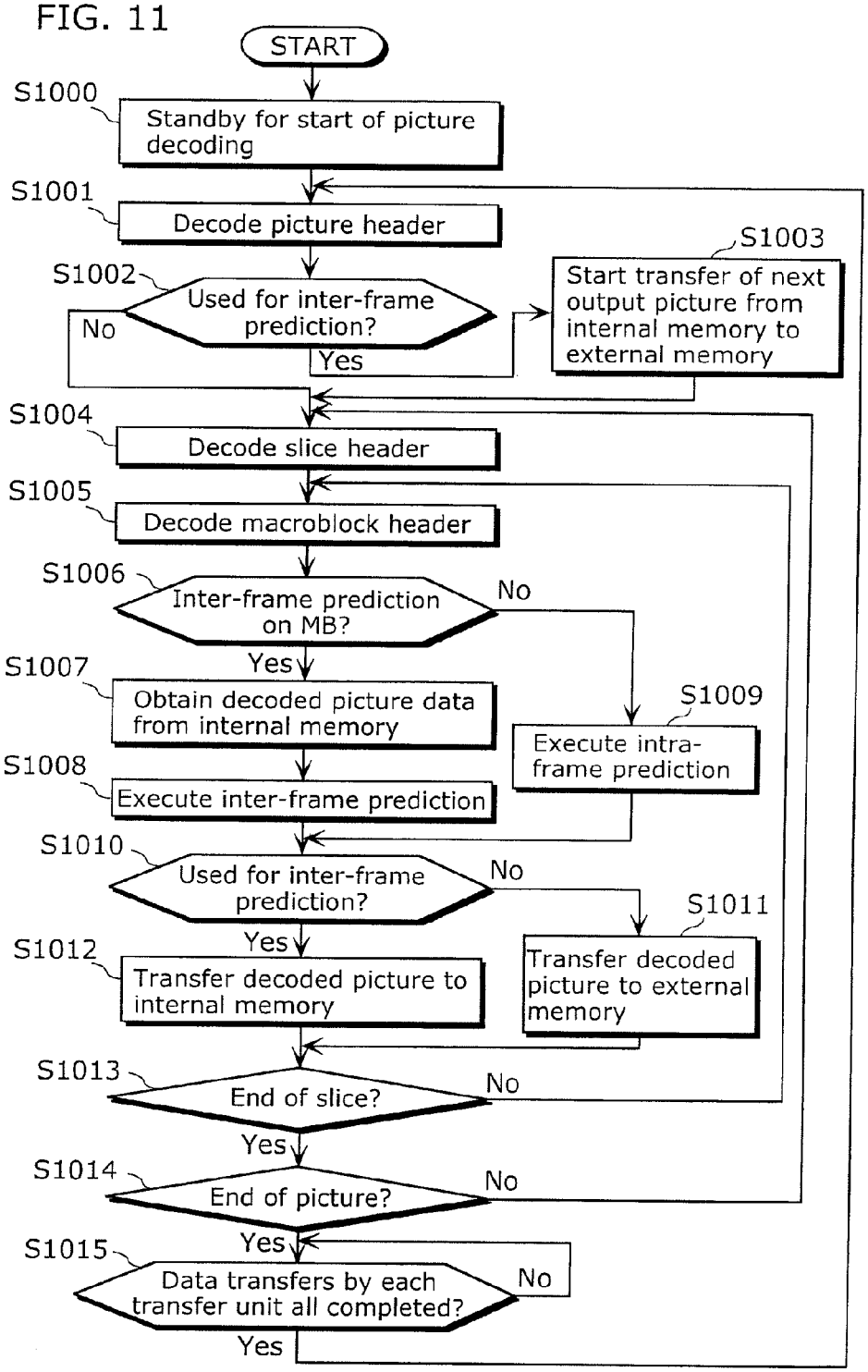
FIG. 11 is a flowchart showing a flow of processing performed by a moving picture decoding apparatus of Embodiment 3.

Next, with reference to FIG. 11, the operation of the moving picture decoding apparatus 30 of Embodiment 3 shall be described.

FIG. 11 is a flowchart showing a flow of processing performed by the moving picture decoding apparatus 30 of Embodiment 3.

Initially, the H.264 decoder 900 is in an initial state of standby for a start of picture decoding (S1000).

When picture decoding starts in this state in response to an instruction from a user, for example, the H.264 decoder 900 decodes a picture header (S1001).

Based on information contained in the decoded picture header, the determination unit 907 determines whether or not the picture is to be used for inter-frame prediction (S1002).

If the picture is not to be used for inter-frame prediction (No in S1002), the H.264 decoder 900 decodes a slice header next (S1004).

On the other hand, if the picture is to be used for inter-frame prediction (Yes in S1002), the result of decoding this picture is written only to the internal memory 906 later in the processing.

In this case, after this picture is decoded, data to be outputted at the time of decoding the subsequent picture is in the internal memory 906 at this stage. Therefore, in order to transfer the data to the external memory 908 so that it is outputted, the second transfer unit 902 starts transfer processing (S1003).

Next, a slice header is decoded (S1004), and a macroblock header is decoded (S1005).

Subsequently, it is determined whether or not inter-frame prediction is to be performed on a currently decoded MB (S1006). If inter-frame prediction is to be performed on the MB (Yes in S1006), the H.264 decoder 900 obtains decoded picture data from the internal memory 906 using the third transfer unit 903. Further, using the obtained decoded picture data, inter-frame prediction is performed (S1008).

If inter-frame prediction is not to be performed on the MB (No in S1006), intra-frame prediction is performed (S1009).

The MB decoded through inter-frame prediction (S1008) or intra-frame prediction (S1009) is written to either the internal memory 906 or the external memory 908.

To be more specific, the destination is determined according to a result of the determination as to whether or not the picture is to be referred to by the subsequent picture for inter-frame prediction (S1010).

If the determination unit 907 determines that the picture is to be referred to by the subsequent picture (Yes in S1010), the decoded MB is transferred to the internal memory 906 using the third transfer unit 903 (S1012).

If the determination unit 907 determines that the picture is not to be referred to by the subsequent picture (No in S1010), the decoded MB is directly written to the external memory 908 using the first transfer unit 901 (S1011).

When the decoding of the MB completes, it is determined whether or not the MB is at the end of the slice to which the MB belongs (S1013). If the MB is not at the end of the slice (No in S1013), the next MB is decoded.

If the MB is at the end of the slice (Yes in S1013), it is then determined whether or not the MB is at the end of the picture (S1014).

If the MB is not at the end of the picture (No in S1014), the next slice is decoded.

If the MB is at the end of the picture (Yes in S1014), completion of the data transfer is ensured (S1015).

In detail, after all the MBs that belong to the picture are decoded, it is determined whether or not the data transfer by each of the transfer units, such as the transfer of the output picture data from the internal memory 906 to the external memory 908, is all finished (S1015).

This determination is made by the H.264 decoder 900 through communication with each of the transfer units, for example.

If the transfers are not yet completed (No in S1015), the completion of the transfers (Yes in S1015) is awaited, and then the next picture is decoded.

With the above procedure, the moving picture decoding apparatus 30 starts decoding the next picture with all the data to be used for inter-frame prediction in the decoding processing stored in the internal memory 906.

This enables the decoding to be performed without accessing the external memory 908 for inter-frame prediction, and thus the external memory 908 needs not to be a high-speed external memory.

Further, the data written to the external memory 908 is data of a picture intended to be outputted after the currently outputted picture. Therefore, in order to store data of decoded pictures, the external memory 908 only needs to have a capacity for 2 pictures.

Supplementary Notes for Embodiments 1 to 3

Embodiments 1 to 3 all have provided a description concerning the H.264 decoding. However, the present invention can be applied to any moving picture coding standard of coding moving picture data with reference to a plurality of frames.

In addition, the present invention can be applied to a reproduction apparatus which reproduces, for example, moving picture data which has been coded.

Figure 12:
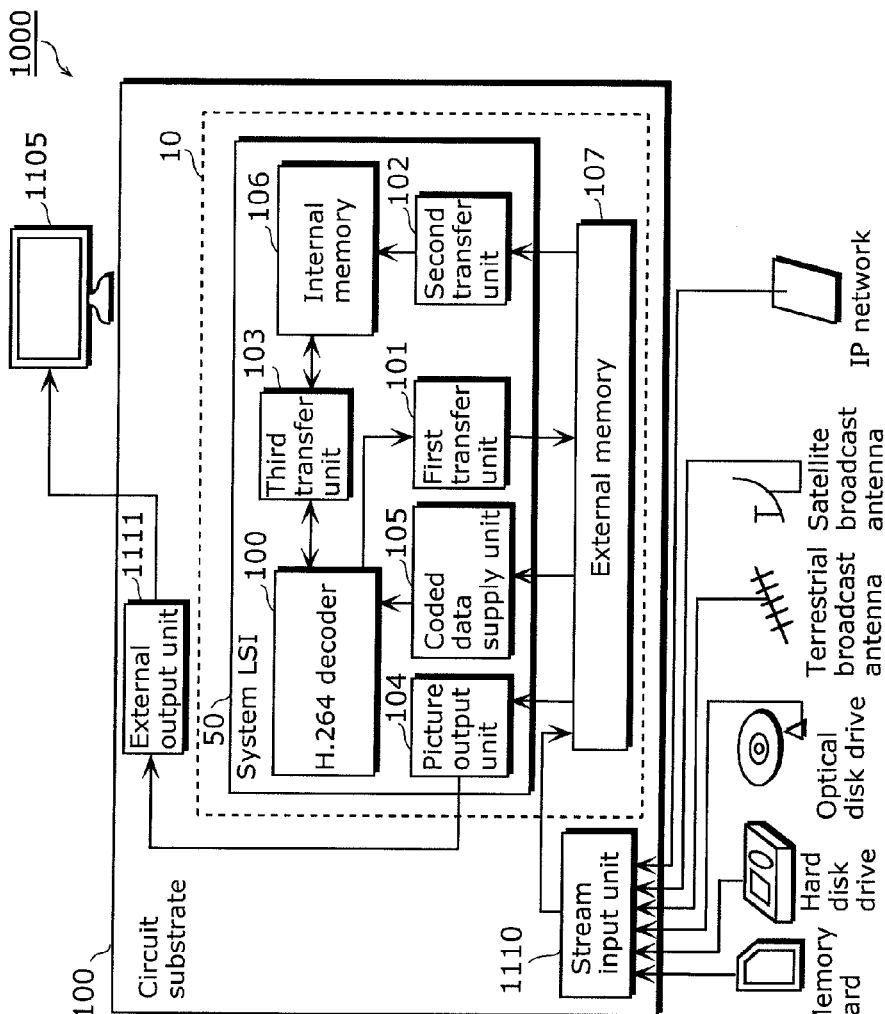
FIG. 12 illustrates the structure of a reproduction apparatus that reproduces coded pictures and includes an integrated circuit to which the present invention is applied.

FIG. 12 illustrates the structure of a reproduction apparatus 1000 that reproduces coded pictures and includes an integrated circuit to which the present invention is applied.

Although FIG. 12 illustrates the structure in which the reproduction apparatus 1000 includes the moving picture decoding apparatus 10 of Embodiment 1, the moving picture decoding apparatus 20 or 30 may be included instead of the moving picture decoding apparatus 10.

As shown in FIG. 12, the reproduction apparatus 1000 includes a circuit substrate 1100 and a display unit 1105.

The circuit substrate 1100 includes a stream input unit 1110, an external output unit 1111, and the moving picture decoding apparatus 10 that includes the system LSI 50 and the external memory 107.

The system LSI 50 is an LSI on which plural functions are integrated, and its functional structure has been described in Embodiment 1.

The stream input unit 1110 is an example of the input unit of the reproduction apparatus according to the present invention, and is a processing unit that reads out a coded stream and supplies it to the moving picture decoding apparatus 10 upon receiving an input signal from a memory card, a hard disk drive, an optical disk drive, a terrestrial broadcast antenna, a satellite broadcast antenna, an Internet Protocol (IP) network, or the like.

To be more specific, the coded stream read out by the stream input unit 1110 is written to the external memory 107. After the coded stream written to the external memory 107 is inputted to the system LSI 50 and decoded, the resultant is written to the external memory 107 by the first transfer unit 101, as in the process flow of Embodiment 1 (see FIG. 3).

It should be noted that the stream input unit 1110 in FIG. 12 is illustrated as a separate circuit mounted on the circuit substrate 1100. However, the stream input unit 1110 may be included inside the system LSI 50, or connected to the circuit substrate 1100 by being mounted on another circuit substrate.

Further, the stream input unit 1110 may be provided as a separate circuit for each external input such as the memory card, the hard disk drive, the optical disk drive, the terrestrial broadcast antenna, the satellite broadcast antenna, and the IP network.

Via the picture output unit 104, decoded picture data written to the external memory 107 is inputted to the external output unit 1111 that is responsible for display by the display unit 1105. The external output unit 1111 outputs the data of the picture to the display unit 1105. This allows the picture to be displayed by the display unit 1105.

It should be noted that the external output unit 1111 in FIG. 12 is illustrated as a separate circuit mounted on the circuit substrate 1100. However, the external output unit 1111 may be included inside the system LSI 50, or connected to the circuit substrate 1100 by being mounted on another circuit substrate.

With the reproduction apparatus 1000 having such a structure and reproducing coded pictures, it is possible to reproduce coded pictures using an integrated circuit with a smaller internal memory.

Further, such a reproduction apparatus 1000 can be used as various appliances that reproduce coded streams inputted from devices such as a memory card, a hard disk drive, an optical disk drive, a terrestrial broadcast antenna, and a satellite broadcast antenna.

It is to be noted that the functional blocks of all the embodiments such as the H.264 decoder, the transfer units, the coded data supply unit, and the picture output unit are typically implemented in the form of an LSI which is an integrated circuit. However, each of them can be made as separate individual chips, or as a single chip to include a part or all of them.

The name used here is LSI, but it may also be called IC, super LSI, or ultra LSI depending on the degree of integration.

Moreover, ways to achieve integration are not limited to the LSI, and a special circuit or a general purpose processor and so forth can also achieve the integration. It is also acceptable to use a Field Programmable Gate Array (FPGA) that can be programmed after the LSI has been manufactured and a reconfigurable processor in which connections and settings of circuit cells within the LSI are reconfigurable.

Furthermore, if integrated circuit technology that replaces LSI appears through progress in semiconductor technology or other derived technology, that technology can naturally be used to carry out integration of the functional blocks.

INDUSTRIAL APPLICABILITY

The present invention provides a moving picture decoding apparatus that decodes coded pictures using inter-frame prediction and efficiently performs the decoding processing without increasing a storage capacity necessary for the decoding. Thus, the moving picture decoding apparatus of the present invention can be used in digital still cameras, digital video cameras, DVD or Blu-ray disc players, digital televisions, receivers of digital television, car navigation systems, set top boxes connected to the Internet, and so on.

The invention claimed is:

1. A moving picture decoding apparatus that decodes moving picture data including a coded picture which has been coded according to a coding scheme of performing inter-frame prediction with reference to a maximum of n pictures, where n is an integer equal to or greater than 2, said moving picture decoding apparatus comprising:

a decoding unit configured to decode the coded picture included in the moving picture data using the inter-frame prediction;

a first storage unit configured to store a decoded picture generated by said decoding unit, for external output of the decoded picture;

a second storage unit configured to store n decoded pictures which can be referred to for the inter-frame prediction by said decoding unit;

a transfer unit configured to transfer the decoded picture from said first storage unit to said second storage unit so that the n decoded pictures are stored in said second storage unit before said decoding unit starts decoding one coded picture; and a picture output unit configured to read the decoded picture stored in said first storage unit, and perform the external output of the decoded picture, wherein said decoding unit is configured to read the n decoded pictures from said second storage unit and decode the one coded picture with reference to the n decoded pictures, the n decoded pictures having been transferred by said transfer unit from said first storage unit to said second storage unit.

2. The moving picture decoding apparatus according to claim 1,
wherein said first storage unit is configured to sequentially accumulate, while said decoding unit decodes the coded picture, decoded data generated by said decoding unit, so as to store all data of the decoded picture which is a result of decoding the coded picture, and
said transfer unit is configured to start a transfer of one of the n decoded pictures between completion of decoding a coded picture which immediately precedes the one coded picture in decoding order and start of decoding the one coded picture.

3. The moving picture decoding apparatus according to claim 2,
wherein, in the transfer, said transfer unit is configured to transfer, from said first storage unit to said second storage unit, a decoded picture which is a result of decoding the immediately preceding picture, as one of the n decoded pictures.

4. The moving picture decoding apparatus according to claim 1, further comprising
a determination unit configured to determine whether or not each of a plurality of decoded pictures is to be referred to for decoding the one coded picture,
wherein said transfer unit is configured to transfer a decoded picture from said first storage unit to said second storage unit so that n decoded pictures are stored in said second storage unit before the decoding of the one coded picture starts, the n decoded pictures being determined by said determination unit to be referred to for decoding the one coded picture.

5. The moving picture decoding apparatus according to claim 4,
wherein said transfer unit is configured to transfer, from said first storage unit to said second storage unit, only a decoded picture, among the n decoded pictures, which is not stored in said second storage unit, the n decoded pictures being determined by said determination unit to be referred to for decoding the one coded picture.

6. The moving picture decoding apparatus according to claim 1,
wherein said decoding unit and said second storage unit are included in a same integrated circuit, and said first storage unit is provided outside the integrated circuit.

7. The moving picture decoding apparatus according to claim 1,
wherein the coded picture included in the moving picture data is data of a picture of 1920×1080 pixels coded according to the coding scheme,
the coding scheme is a coding scheme of performing inter-frame prediction with reference to a maximum of 4 pictures defined by an H.264 standard, and
said decoding unit is configured to decode the coded picture with reference to one or more decoded pictures among 4 decoded pictures transferred from said first storage unit to said second storage unit.

8. A reproduction apparatus that reproduces moving picture data, said reproduction apparatus comprising:
a moving picture decoding apparatus according to claim 1;
an input unit configured to receive an input of the moving picture data and to supply the received data to said moving picture decoding apparatus; and
a display unit configured to sequentially display a plurality of decoded pictures outputted from said first storage unit.

9. A moving picture decoding method for decoding moving picture data including a coded picture which has been coded according to a coding scheme of performing inter-frame prediction with reference to a maximum of n pictures, where n is an integer equal to or greater than 2, said moving picture decoding method comprising:
decoding the coded picture included in the moving picture data using the inter-frame prediction;
storing in a first storage unit a decoded picture generated in said decoding, for external output of the decoded picture;
transferring the decoded picture from the first storage unit to a second storage unit so that n decoded pictures which can be referred to for the inter-frame prediction in said decoding are stored in the second storage unit before decoding of one coded picture starts in said decoding; and
reading the decoded picture stored in the first storage unit, and performing the external output of the decoded picture,
wherein in said decoding, the n decoded pictures stored in the second storage unit are read, and the one coded picture is decoded with reference to the n decoded pictures stored in the second storage unit, the n decoded pictures having been transferred in said transferring from the first storage unit to the second storage unit.

10. An integrated circuit for use in a moving picture decoding apparatus that decodes moving picture data including a coded picture which has been coded according to a coding scheme of performing inter-frame prediction with reference to a maximum of n pictures, where n is an integer equal to or greater than 2, said integrated circuit comprising:
a decoding unit configured to decode the coded picture included in the moving picture data using the inter-frame prediction;
a first transfer unit configured to transfer a decoded picture generated by said decoding unit to a first storage unit provided outside said integrated circuit;
a second storage unit configured to store n decoded pictures which can be referred to for the inter-frame prediction by said decoding unit;
a second transfer unit configured to transfer the decoded picture from the first storage unit to said second storage unit so that the n decoded pictures are stored in said second storage unit before said decoding unit starts decoding one coded picture; and
a picture output unit configured to read the decoded picture stored in the first storage unit, and perform external output of the decoded picture,
wherein said decoding unit is configured to read the n decoded pictures from said second storage unit and decode the one coded picture with reference to the n decoded pictures, the n decoded pictures having been transferred by said second transfer unit from said first storage unit to said second storage unit.

* * * * *